United States Patent Office 3,510,201
Patented May 5, 1970

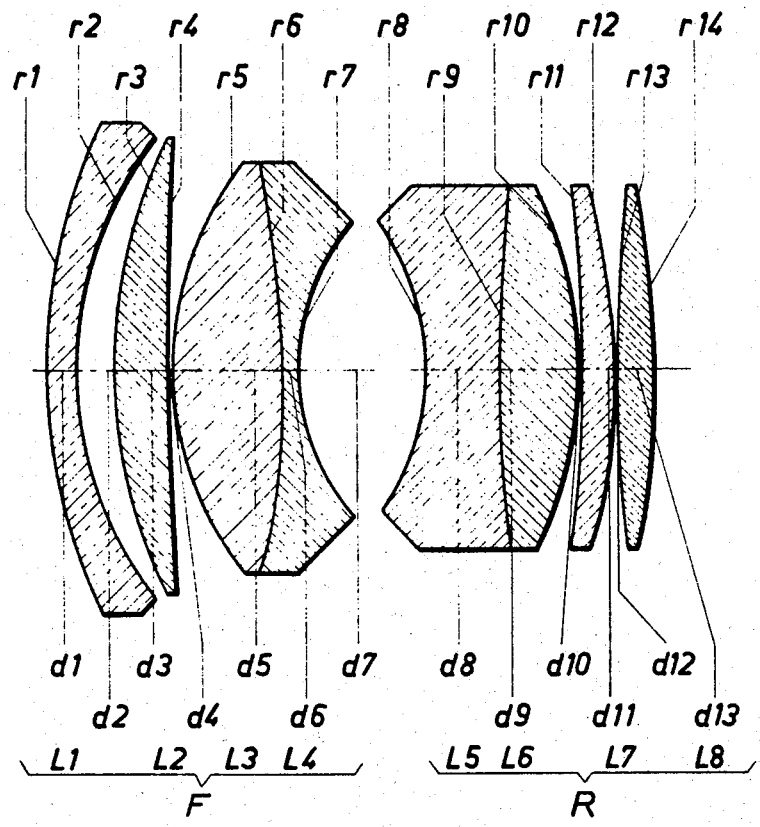

3,510,201
HIGH-SPEED PHOTOGRAPHIC OR CINEMATOGRAPHIC OBJECTIVE
Klaus Elle, Bad Kreuznach, Germany, assignor to Jos. Schneider & Co., Optische Werke Kreuznach, Bad Kreuznach, Germany, a German corporation
Filed Sept. 8, 1967, Ser. No. 666,319
Claims priority, application Germany, Sept. 15, 1966, Sch 39,540
Int. Cl. G02b 9/62
U.S. Cl. 350—176   1 Claim

ABSTRACT OF THE DISCLOSURE

Optical objective with a front lens group and a rear lens group separated by a diaphragm space, each group consisting of a negative component in the form of a doublet adjacent the diaphragm space and of a positive component remote from that space, each doublet being composed of a biconcave lens next to the diaphragm space and a biconvex lens separated therefrom by a cemented surface which is positively refracting in the case of the front doublet and negatively refracting in the case of the rear doublet, the positive front component consisting of a meniscus-shaped negative singlet with rearwardly facing concavity followed by a rearwardly concave positive singlet, the positive rear component consisting of a forwardly concave positive singlet followed by a biconvex singlet.

---

My present invention relates to a high-speed optical objective, for photographic or cinematographic cameras, of the gaussian type wherein a diaphragm space is bounded by the concave surfaces of two meniscus-shaped negative lens members which in turn are bracketed by positive lens members.

The general object of this invention is to provide an objective of this structure designed to operate with a large angle of view, upwards of 45°, at aperture ratios as high as 1:1.4 and with substantial suppression of the spherical zonal aberrations heretofore encountered with this type of objective. Other objects include the maintenance of a back-focal length greater than 70% of the overall focal length and the realization of an exit-pupil diameter below 60% of that overall focal length.

I have found in accordance with the present invention that the foregoing objects can be satisfied, with obtention of high-quality images, by the provision of an objective of the character set forth whose front lens group consists of a positive first component composed of two air-spaced meniscus-shaped singlets with rearwardly facing concavities, the first singlet being negatively and the second singlet being positively refractive, and a negative second component in the form of a doublet, the rear lens group of the objective consisting of a negative third component in the form of a doublet and of a positive fourth component in the form of two air-spaced singlets, i.e. a third singlet in the shape of a forwardly concave positive meniscus and a fourth singlet represented by a biconvex lens; each doublet is composed of a biconvex and a biconcave lens, the latter adjoining the diaphragm space and being separated from its mate by a cemented surface which is positively refractive in the case of the second component and negatively refractive in the case of the third component.

The following relationships should be observed for optimum performance:

(a) With the refractive power $P_1$ of the negative front meniscus ranging between 0.2 and 0.4 times the overall refractive power $P \equiv 1/f$ ($f$ being the overall focal length), the reciprocal value of the radius of curvature of the rear surface of that meniscus should fall between 1.55P and 1.65P, preferably ranging between $5P_1$ and $6P_1$.

(b) The reciprocal value of the radius of curvature of the rear surface of the cemented singlet should fall between 0.15P and 0.25P, preferably ranging between $\frac{1}{2}P_1$ and $\frac{3}{4}P_1$.

(c) The reciprocal value of the radius of curvature of the cemented surface of the first (object-side) doublet should fall between 0.5P and 0.9P, preferably ranging between $2P_1$ and $3P_1$.

(d) The reciprocal value of the radius of curvature of the front surface of the second (image-side) doublet should fall between 2.15P and 2.30P, preferably ranging between $7P_1$ and $8P_1$.

(e) The refractive indices $n_d$ of all positive lenses of the objective should be greater than 1.78.

(f) The refractive index of the biconvex lens of the first doublet should exceed that of the biconcave lens thereof by a value ranging between 0.08 and 0.12.

(g) The negative front meniscus should have an axial thickness less than half the width of the diaphragm space.

(h) The width of the diaphragm space and the axial thickness of the second doublet, taken together, should fall between $0.45f$ and $0.49f$, preferably ranging between 9 and 11 times the axial thickness of the front meniscus.

The provision of a negatively refractive front lens, satisfying the relationships set forth under points (a), (b) and (c), is designed to obviate the drawbacks of known gaussian objectives in which the Seidel sums of the partial aberrations of the front and rear lens groups, particularly those of the first Seidel constant, are not substantially equal and opposite as would be necessary for a suppression of spherical aberration. In the system according to the present invention, with the rear surface of the front lens so curved that its partial spherical aberration is substantially of the same order of magnitude (but of the opposite sign) as that of the first surface of the rear group (i.e. the concave face of the second doublet), the spherical aberration in the front group is over-corrected to such an extent as to make the overall Seidel sum relatively small. By this means it even becomes possible to increase some individual Seidel values with a view to improve overall correction of field curvature. The collective cemented surface of the first doublet may be made more strongly refractive at the same time. This, in combination with the described proportioning of the eighth radius of curvature pursuant to point (d) whereby the forward faces of the second doublet is shallower than the rear face of the front lens, reduces the higher-order chromatic aberration.

The relationships set forth under points (e)–(h) provide the desired back-focal length in excess of $0.7f$ and insure suitable illumination of the image corners even at large relative apertures while keeping the diameter of the exit pupil within the aforestated limits.

The sole figure in the accompanying drawing illustrates an objective according to my invention.

The objective shown in the drawing comprises a front lens group F, consisting of a positive first component and a negative second component, the first component being constituted by a negative meniscus L1 with radii r1, r2 and thickness d1, separated by an air space d2 from a positive second meniscus l2 with radii r3, r4 and thickness d3; the second component, separated from singlet L2 by an air space d4, is a doublet composed of a biconvex lens L3 (radii r5, r6 and thickness d5) and a biconcave lens L4 (radii r6, r7 and thickness d6), the more strongly curved rear surface r7 of this biconcave lens bounding a diaphragm space d7 which is also bounded by the more strongly curved front surface r8 of a biconcave lens L5 of thickness d8 which is cemented by its rear surface r9 onto a biconvex lens L6 having a thickness d9 and a rear radius r10. The doublet L5, L6 is a negative third component forming part of a rear lens group R, this group also including a positive fourth component which is separated from lens L6 by an air space d10 and consists of a positive meniscus L7 (radii r11, r12 and thickness d11) and a biconvex lens L8 (radii r13, r14 and thickness d13); the intervening air space has been designated d12.

In the following Table I, I have set forth representative values for the parameters r1–r14 and d1–d13 of the system shown in the drawing, together with the refractive indices $n_d$, the Abbé numbers $\nu$ and the surface powers $\Delta n/r$ of lenses L1–L8, the system so defined having an aperture ratio of 1:1.4, an image angle of 45°, and a back-focal length of 0.7264 units of length based on an overall focal length $f=1$; in practice, $f$ may be 100 mm.

following Table II I have set forth the first 9 Seidel values for the surfaces of the illustrated objective together with their subtotals for groups F and R as well as their overall values.

TABLE 2.—SEIDEL ABERRATIONS

| | | | | | | | | | |
|---|---|---|---|---|---|---|---|---|---|
| r1 | +0.24 | +0.11 | +0.05 | +0.37 | +0.42 | +0.51 | +0.18 | +8.70 | −3.83 |
| r2 | −1.87 | −0.07 | −0.00 | −0.58 | −0.58 | −0.58 | −0.02 | −15.66 | +0.55 |
| r3 | +0.97 | +0.26 | +0.07 | +0.49 | +0.55 | +0.69 | +0.15 | +14.35 | −3.77 |
| r4 | +0.01 | −0.06 | +0.30 | −0.08 | +0.22 | +0.82 | −1.02 | +2.39 | +11.04 |
| r5 | +0.25 | +0.09 | +0.04 | +0.79 | +0.83 | +0.90 | +0.31 | +15.53 | −5.89 |
| r6 | +0.46 | −0.33 | +0.24 | +0.02 | +0.26 | +0.74 | −0.19 | −2.75 | −1.98 |
| r7 | −0.29 | −0.19 | −0.13 | −1.08 | −1.21 | −1.46 | −0.81 | −14.94 | +9.96 |
| Total (F) | −0.23 | −0.19 | +0.57 | −0.07 | +0.49 | +1.80 | −1.40 | +7.62 | +6.08 |
| r8 | −1.65 | +0.97 | −0.57 | −1.00 | −1.57 | −2.72 | +0.93 | −22.13 | −13.04 |
| r9 | −0.01 | −0.01 | −0.02 | −0.00 | −0.02 | −0.06 | −0.03 | −6.40 | +9.95 |
| r10 | +0.38 | −0.23 | +0.14 | +0.62 | +0.76 | +1.04 | −0.47 | +9.04 | +5.52 |
| r11 | −0.01 | +0.05 | −0.15 | −0.14 | −0.28 | −0.57 | +0.89 | −2.75 | −8.70 |
| r12 | +0.50 | −0.29 | +0.17 | +0.40 | +0.57 | +0.91 | −0.33 | +8.78 | +5.12 |
| r13 | −0.02 | +0.07 | −0.29 | +0.12 | −0.17 | −0.75 | +0.73 | −2.04 | −8.94 |
| r14 | +1.21 | −0.38 | +0.12 | +0.27 | +0.39 | +0.63 | −0.12 | +10.61 | +3.32 |
| Total (R) | +0.40 | +0.15 | −0.60 | +0.27 | −0.32 | −1.52 | +1.60 | −4.89 | −6.77 |
| Sum | +0.17 | −0.04 | −0.03 | +0.20 | +0.17 | +0.09 | +0.20 | +2.73 | −0.69 |

TABLE I

| Lens | Radii | Thicknesses and Separations | $n_d$ | $\nu$ | $\Delta n/r$ |
|---|---|---|---|---|---|
| F L1 | r1=+0.9812 | d1=0.0479 | 1.56732 | 42.8 | +0.0578173 |
| | r2=+0.6297 | d2=0.0671 | | | −0.0900866 Air space |
| F L2 | r3=+0.9057 | d3=0.0862 | 1.78443 | 43.9 | +0.0866084 |
| | r4=+5.4044 | d4=0.0019 | | | −0.0145145 Air space |
| F L3 | r5=+0.5554 | d5=0.1916 | 1.78179 | 37.1 | +0.1407640 |
| F L4 | r6=−1.5370 | d6=0.0287 | 1.68893 | 31.2 | +0.0060416 |
| | r7=+0.3789 | d7=0.2108 | | | −0.1818311 Diaphragm space |
| R L5 | r8=−0.4496 | d8=0.1245 | 1.80518 | 25.4 | −0.1790873 |
| R L6 | r9=+2.4979 | d9=0.1342 | 1.78443 | 43.9 | −0.0008306 |
| | r10=−0.7077 | d10=0.0019 | | | +0.1108344 Air space |
| R L7 | r11=−3.2532 | d11=0.0575 | 1.78443 | 43.9 | −0.0241126 |
| | r12=−1.1153 | d12=0.0019 | | | +0.0703405 Air space |
| R L8 | r13=+3.5320 | d13=0.0671 | 1.78443 | 43.9 | +0.0222089 |
| | r14=−1.6338 | | | | +0.0480130 |

The numerical values of the foregoing table are to be understood as valid within tolerance limits of substantially ±10% for the thicknesses and separations d1–d13, the surface powers $\Delta n/r$ and the Abbé numbers $\nu$ and of substantially ±0.02 for the refractive indices $n_d$ given for a reference wavelength of 587.6 microns. In view of these tolerances, the final decimals given in the table are only of minor significance.

The front lens L1 of the described objective has a refractive power $P_1=0.3068$ satisfying the aforestated relationships (a) through (d) concerning radii r2, r4, r6 and r8. Conditions (e) through (h) are also fulfilled, with $d1 < \frac{1}{2}d7$ and $d7+d8+d9=0.4695 \approx 10d1$. In the

I claim:

1. An optical objective with a front lens group and a rear lens group separated by a diaphragm space, said front lens group consisting of a positively refracting first component followed by a negatively refracting second component, said rear lens group consisting of a negatively refracting third component followed by a positively refracting fourth component, said second and third components being doublets each composed of a biconcave lens adjoining said diaphragm space and a biconvex lens separated therefrom by a cemented surface, the cemented surface of the second component being positively refracting and the cemented surface of the third component being negatively refracting, said first component being composed of a meniscus-shaped negative first singlet followed by a meniscus-shaped positive second singlet each having a rearwardly facing concavity, said fourth component being composed of a meniscus-shaped positive third singlet with a forwardly facing concavity followed by a biconvex fourth singlet; said first singlet L1, said second singlet L2, said biconvex lens L3 and said biconcave lens L4 of said second component, said biconcave lens L5 and said biconvex lens L6 of said third component, said third singlet L7 and said fourth singlet L8 having radii of curvature r1 to r14 and thicknesses and separations d1 to d15 whose numerical values, based upon a numerical value of 1 for the overall focal length, along with the refractive indices $n_d$ and the Abbé number $\nu$ thereof are substantially as given in the following table:

| Lens | Radii | Thicknesses and Separations | $n=d$ | $\nu$ |
|---|---|---|---|---|
| L1 | r1=+0.98 | d1=0.05 | 1.57 | 43 |
| | r2=+0.63 | d2=0.07 | Air space | |
| L2 | r3=+0.91 | d3=0.09 | 1.78 | 44 |
| | r4=+5.40 | d4=0.002 | Air space | |
| L3 | r5=+0.56 | d5=0.19 | 1.78 | 37 |
| L4 | r6=−1.54 | d6=0.03 | 1.69 | 31 |
| | r7=+0.38 | d7=0.21 | Diaphragm space | |
| L5 | r8=−0.45 | d8=0.12 | 1.81 | 25 |
| L6 | r9=+2.50 | d9=0.13 | 1.78 | 44 |
| | r10=−0.71 | d10=0.002 | Air space | |
| L7 | r11=−3.25 | d11=0.06 | 1.78 | 44 |
| | r12=−1.12 | d12=0.002 | Air space | |
| L8 | r13=+3.53 | d13=0.07 | 1.78 | 44 |
| | r14=1.63 | | | |

(References on following page)

References Cited

UNITED STATES PATENTS 2,701,982  2/1955  Angenieux ............ 350—215

FOREIGN PATENTS 1,020,462  2/1966  Great Britain.

DAVID SCHOUNBERG, Primary Examiner
A. M. OSTRAGER, Assistant Examiner

U.S. Cl. X.R.
350—215